(12) United States Patent
Kaur et al.

(10) Patent No.: US 11,487,948 B2
(45) Date of Patent: Nov. 1, 2022

(54) METHOD AND SYSTEM FOR AUTOMATED AUTONOMOUS INTENT MINING

(71) Applicant: Conduent Business Services, LLC, Florham Park, NJ (US)

(72) Inventors: Simarjot Kaur, Bangalore (IN); Sachin Mittal, Bangalore (IN); Sandya Srivilliputtur Mannarswamy, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 309 days.

(21) Appl. No.: 16/794,776

(22) Filed: Feb. 19, 2020

(65) Prior Publication Data

US 2021/0256220 A1     Aug. 19, 2021

(51) Int. Cl.
*G06F 40/30*       (2020.01)
*G06F 40/289*      (2020.01)
*G06N 20/00*       (2019.01)

(52) U.S. Cl.
CPC ............ *G06F 40/30* (2020.01); *G06F 40/289* (2020.01); *G06N 20/00* (2019.01)

(58) Field of Classification Search
CPC ........ G06F 40/30; G06F 40/289; G06F 40/35; G06N 20/00; G06N 3/0454
See application file for complete search history.

(56) References Cited

U.S. PATENT DOCUMENTS 9,672,825 B2 * 6/2017 Arslan ..................... G10L 15/07
10,930,272 B1 * 2/2021 Orkin ..................... G10L 15/063
10,943,583 B1 * 3/2021 Gandhe ................. G10L 15/183
11,024,299 B1 * 6/2021 Drake .................... G10L 15/197
11,082,369 B1 * 8/2021 Liu .......................... G06N 3/04

(Continued)

FOREIGN PATENT DOCUMENTS

| CA | 3039759 A1 | * | 3/2018 | ............... G06F 7/02 |
| CN | 111061839 A | * | 4/2020 | |
| WO | WO-2008047339 A2 | * | 4/2008 | ............. G10L 17/06 |

OTHER PUBLICATIONS

Ballard, D. H., "Modular learning in neural networks" In Proceedings of the Sixth National Conference on Artificial Intelligence AAAI'87, AAAI Press, 1987. ISBN 0-934613-42-7. URL http://dl.acm.org/citation. cfm?id=1863696.1863746 1:279-284 (1987).

(Continued)

*Primary Examiner* — Anne L Thomas-Homescu
(74) *Attorney, Agent, or Firm* — Jones Robb, PLLC (57) ABSTRACT

An autonomous automated intent mining system extracts intents from stored conversations in a text-based chat corpus for use in an AI-driven dialog system. The intent mining system includes an intelligent pre-processor for extracting the conversation data from a computer memory and operating on the conversation data to identify relevant utterances. The system additionally includes a representation processor for operating on the identified relevant utterances to create a numerical representation. The system also includes a clustering processor for generating clusters of utterances and classifying each of the identified relevant utterances into a cluster based on the numerical representation of each utterance. Each generated cluster represents a unique intent for use in the AI-driven dialog system.

16 Claims, 8 Drawing Sheets

(56) References Cited

U.S. PATENT DOCUMENTS

| | | | | |
|---|---|---|---|---|
| 2020/0311738 | A1* | 10/2020 | Gupta | G06F 16/22 |
| 2021/0004537 | A1* | 1/2021 | Sapugay | G06F 16/3329 |
| 2021/0027155 | A1* | 1/2021 | Chawla | G06F 40/10 |
| 2021/0083994 | A1* | 3/2021 | Pan | G06K 9/6267 |
| 2021/0097140 | A1* | 4/2021 | Chatterjee | G06N 3/049 |
| 2021/0103634 | A1* | 4/2021 | Gkikas | G06F 40/211 |
| 2021/0110475 | A1* | 4/2021 | Singh | G06Q 20/127 |
| 2021/0149963 | A1* | 5/2021 | Agarwal | G06F 16/90332 |
| 2021/0256045 | A1* | 8/2021 | Jiao | G06N 5/043 |
| 2021/0256534 | A1* | 8/2021 | An | G06Q 30/016 |

OTHER PUBLICATIONS

Blondel, V. D. et al., "Fast unfolding of communities in large networks," J. of Statistical Mechanics: Theory & Experiments v. Oct. 2008.

Cer, D. et al., "Universal sentence encoder." CoRR, abs/1803. 11175, 2018. URL http://arxiv.org/abs/1803.11175.

Devlin, J. et al., "BERT: pre-training of deep bidirectional transformers for language understanding." CoRR, abs/1810.04805 URL http://arxiv.org/abs/1810.04805. (2018).

Finegan-Dollak, C. et al., "Effects of creativity and cluster tightness on short text clustering performance." Proc. Of the 54th Annual Mtg of the Assoc for Computational Linguistics Aug. 7-12, 2016, ACL, 654-665 (2016).

Guo, X. et al., "Improved deep embedded clustering with local structure preservation." In Proceedings of the Twenty-Sixth International Joint Conference on Artificial Intelligence, IJCAI-17, doi: 10.24963/ijcai.2017/243. URL https://doi.org/10.24963/ijcai.2017/243. 1753-1759 (2017).

Haponchyk, I. et al. "Supervised clustering of questions into intents for dialog system applications." Proceedings of the 2018 Conference on Empirical Methods in Natural Language Processing (2018).

Mikolov, T., et al., "Efficient estimation of word representations in vector space," URL http://arxiv.org/abs/1301.3781 (2013).

Kvålseth, T. O. "On normalized mutual information: measure derivations and properties." Entropy 19:11:631 (2017).

P, Deepak. "MixKMeans: Clustering question-answer archives." In Proceedings of the 2016 Conference on Empirical Methods in Natural Language Processing, Austin, Texas. Association for Computational Linguistics, doi: 10.18653/v1/D16-1164. URL https://www.aclweb.org/anthology/D16-1164. 1576-1585 (Nov. 2016).

Pedregosa, F. et al., "Scikit-learn: Machine learning in Python." Journal of Machine Learning Research, 12:2825-2830 (2011).

Shi, C. et al., Auto-dialabel: Labeling dialogue data with unsupervised learning. In Proceedings of the 2018 Conference on Empirical Methods in Natural Language Processing, Brussels, Belgium, Association for Computational Linguistics. doi: 10.18653/v1/D18-1072. URL https://www.aclweb.org/anthology/D18-1072. pp. 684-689 (Oct. 11, 2018).

Xie, J. et al., "Unsupervised deep embedding for clustering analysis." CoRR, abs/1511.06335, 2015. URL http://arxiv.org/abs/1511.06335 (2015).

Yeung & Ruzzo. "Details of the adjusted rand index and clustering algorithms, supplement to the paper an empirical study on principal component analysis for clustering gene expression data." Bioinformatics 17(9):763-774 (2001).

\* cited by examiner

METHOD AND SYSTEM FOR AUTOMATED AUTONOMOUS INTENT MINING

TECHNICAL FIELD

Aspects of the disclosure are related to development and improvement of artificial intelligence (AI) driven dialog systems.

BACKGROUND

The growth of AI has fueled progress in intelligent conversational AI driven dialog systems and chatbots. Recent advances in machine learning and natural language processing have led to the development of virtual conversational agents such as Apple Siri™, Google Assistant™, Amazon Alexa™, etc. In order to operate successfully, AI dialog systems require the ability to understand human utterances. Building automated intelligent dialog systems that can hold successful and human-like conversations requires the intelligent dialog system to understand the intent behind the human utterance. Understanding of the intent requires the development of sophisticated intent recognition techniques for identifying intent from human utterances.

Intent detection is typically formulated as a supervised intent classification problem where a human dialog designer manually specifies the intents and their corresponding sample utterances in order to train a supervised intent classifier. Given a piece of text, namely the human user utterance, and each of the intents defined by the dialog designer, the task of predicting the intent of a new utterance reduces to a standard text classification problem. Popular commercial and open source conversational platforms such as Microsoft's LUIS™, Google's DialogFlow™ and RASA™ typically have a natural language understanding (NLU) module, which provides such an intent classifier. These systems require a large volume of labelled data of <utterance, intent> pairs to train the intent classifier. As set forth above, the acquisition of these pairs requires repeated action by a human dialog agent.

Many problems arise in the context of currently available intent classifiers. Typically, for domain specific chatbots, there is insufficient labelled data for each intent. Customer intents repeat in the dataset and there are different ways of expressing the same intent. Typically to train a dialog agent, a labelled dataset is required that captures all possible customer intents expressed in multiple ways.

Manual labelling of a dialog dataset/conversation corpus is extremely time-consuming, error-prone and expensive. More importantly, the dialog designer ends up having to manually specify intents. Additionally, a wide and diverse set of sample utterances must be provided for each intent. The manual labelling process not only consumes considerable time and effort but is further prone to missed dialog system configurations due to human oversight.

Thus, existing processes are error-prone and costly, and require repetitive efforts for each domain as each will have its own set of intents and corresponding utterances. Conversations go awry when user intent is not recognized correctly. When an AI dialog system fails to make a correct response, this is often due to intent recognition errors resultant from missed intents, undefined intents, and misclassified intents. Each of these errors requires different handling to improve intent recognition.

Accordingly, a solution is needed for reducing both the manual effort required to build a high-quality labelled training dataset needed for training an intent recognition model, and the frequency of intent recognition errors. An automated intent mining system is needed that will automatically extract intents and sample utterances from a raw and unlabeled historical conversation corpus. Such an automatic intent mining system will considerably reduce the manual effort and will help the dialog designer in building a high-quality training dataset that includes all intents expressed in the conversation corpus in a diverse set of ways. Training an intent recognition model on such a high coverage and diverse dataset will further reduce the chances of intent misclassification thereby improving the performance of an automated dialog system.

SUMMARY

According to embodiments illustrated herein, an autonomous automated intent mining system is provided for automatic extraction of intents from stored conversations for use in an AI-driven dialog system. The intent mining system includes an intelligent pre-processor for operating on a text-based conversation corpus stored in a computer memory. The intelligent pre-processor operates on the text-based corpus to identify relevant utterances. The intent mining system may additionally include a representation processor for operating on the identified relevant utterances to create a numerical representation of each of the identified relevant utterances. The system may additionally include a clustering processor for generating clusters of utterances and classifying each of the identified relevant utterances into a cluster based on the numerical representation of each utterance. Each generated cluster represents a unique intent for use in the AI-driven dialog system.

In an additional embodiment, an autonomous automated computer-implemented intent mining method is provided for automated extraction of intents from stored conversations for use in an AI-driven dialog system. The intent mining method includes operating on a text-based conversation corpus stored in a computer memory with an intelligent pre-processor to identify relevant utterances from within the text-based conversation corpus. The method additionally includes operating on the identified relevant utterances using a representation processor to create a numerical representation of each of the identified relevant utterances. The method further includes generating clusters of utterances and classifying each of the identified relevant utterances into a cluster based on the numerical representation of each utterance. Each generated cluster represents a unique intent for use in the AI-driven dialog system.

In yet an additional embodiment, a computer-readable medium storing computer code is provided. When executed by a processor, the computer code causes the computer to perform an autonomous automated intent mining method for automated extraction of intents from stored conversations for use in an AI-driven dialog system. The method performed upon execution of the code includes operating on a text-based conversation corpus to identify relevant utterances from within the text-based conversation corpus. The method additionally includes operating on the identified relevant utterances to create a numerical representation of each of the identified relevant utterances. The method further includes generating clusters of utterances and classifying each of the identified relevant utterances into a cluster based on the numerical representation of each utterance. Each generated cluster represents a unique intent for use in the AI-driven dialog system.

BRIEF DESCRIPTION OF DRAWINGS

The accompanying drawings illustrate various embodiments of systems, methods and various other aspects of the invention. Any person with ordinary skill in the art will appreciate that the illustrated element boundaries (e.g., boxes, groups of boxes, or other shapes) in the figures represent one example of the boundaries. In a few examples, one element may be designed as multiple elements or multiple elements may be designed as one element. In a few examples, an element shown as an internal component of one element may be implemented as an external component in another, and vice versa. Furthermore, elements may not be drawn to scale. Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are for explanatory purposes, as methods and systems may extend beyond the described embodiments. For example, the needs of an application may yield multiple alternate and suitable approaches to implement functionality of any detail described herein. Therefore, any approach may extend beyond the implementation choices in the following embodiments.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Embodiments of the invention enable intent mining of specific high-level intents associated with sample utterances from an unlabeled historical chat or conversation corpus. The system aims to automatically extract such specific high-level intents along with their sample utterances in an unsupervised fashion from a raw corpus, providing as an output Intent clusters' with corresponding 'sample utterances'. This high-quality output can improve the performance of intent classifiers, which are the heart of automated dialog agents.

Embodiments of the invention are directed to a system and method for autonomous or unsupervised intent mining. The system performs autonomous or unsupervised identification of sample utterances from the historical conversation corpus along with the associated intents. The data in the historical conversation corpus may be raw and unlabeled data. The system design provides for automatic intent mining such that distinct and specific user intents can be extracted from raw conversation utterances without any supervision. None of the components of the disclosed system requires labelled data for learning and extracting the intents. Yet, in contrast to previous approaches, the system is able to extract specific user intents with a high accuracy and without any supervision. These features contribute to a cost-effective solution for practical use in a real-world dialog setting.

Figure 1:
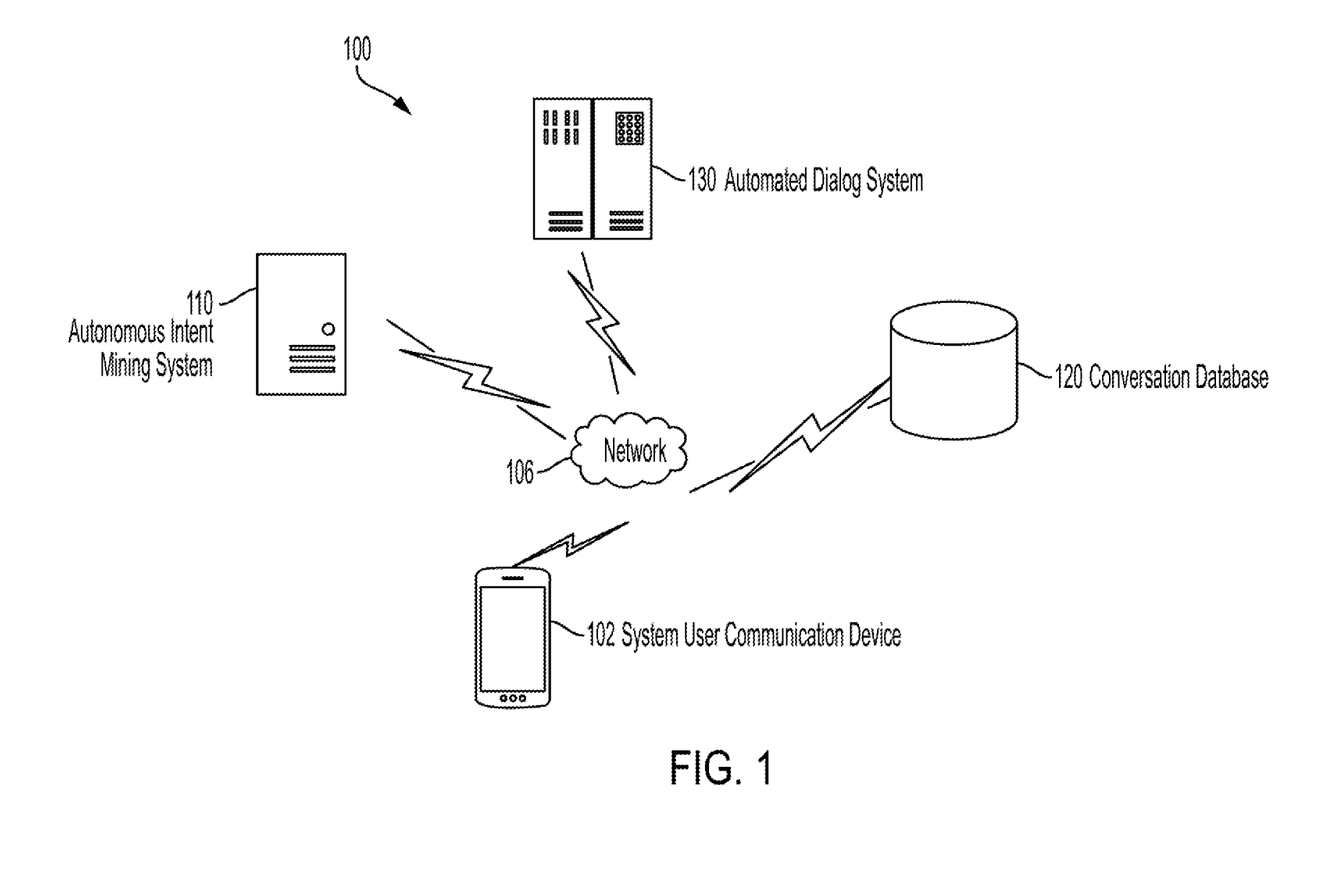
FIG. 1 is a block diagram illustrating an operating environment for an autonomous intent mining system in accordance with at least one embodiment.

FIG. 1 is a block diagram illustrating an operating environment 100 for an autonomous intent mining system 110 in accordance with at least one embodiment. The automated autonomous intent mining system 110 is connected over a network 106 with a conversation database 120. An automated dialog system 130 and multiple customer systems 102 may also be connected over the network.

The customer systems 102a, b and c may be operated by an individual seeking information through the automated dialog system 130. The customer systems system 102 may be or include a mobile phone, landline phone, computing device such a laptop or desktop computer, a tablet, a personal digital assistant (PDA), or other device capable of accepting audio input and communicating with the automated dialog system 130.

The network 106 may include a wired or wireless local area network (LAN) and a wide area network (WAN), wireless personal area network (PAN), a cellular telephone network and other types of networks. Although only one network is shown, the computers may be connected over multiple disparate networks. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The automated autonomous intent mining system 110 includes a computing system capable of accessing the conversation database 120 in order to extract utterances and mine intents to create output that can be used for an intent classifier for the automated dialog system 130. Details of the automated autonomous intent mining system 110 are further illustrated in FIG. 2 and are described below.

The conversation database 120 may be or include a database storing historical chat data. The chat data may be collected based on conversations between a human agent and a human customer or alternatively based on conversations between an automated agent and a human customer. The data may be raw and unlabeled. In operation, the autonomous intent mining system 110 extracts utterances from the conversation database 120 in order to classify those utterances in accordance with an intent. The conversational database can be implemented by using several technologies that are well known to those skilled in the art. Some examples of technologies may include, but are not limited to, MySQL® and Microsoft SQL®. In an embodiment, the databases may be implemented as cloud storage. Examples of cloud storage may include, but are not limited to, Amazon E3® and Hadoop® distributed file system.

The automated dialog system 130 may be or include any known AI chatbot system that has the need to understand and respond to human speech. For example, the automated dialog system 130 may include an automatic speech recognizer (ASR), a natural understanding unit (NLU) and other features useful in processing speech data or text data. The automated dialog system 130 may be able to process both speech and text data. Text data can be utilized, for example, in an online chat system.

Figure 2:
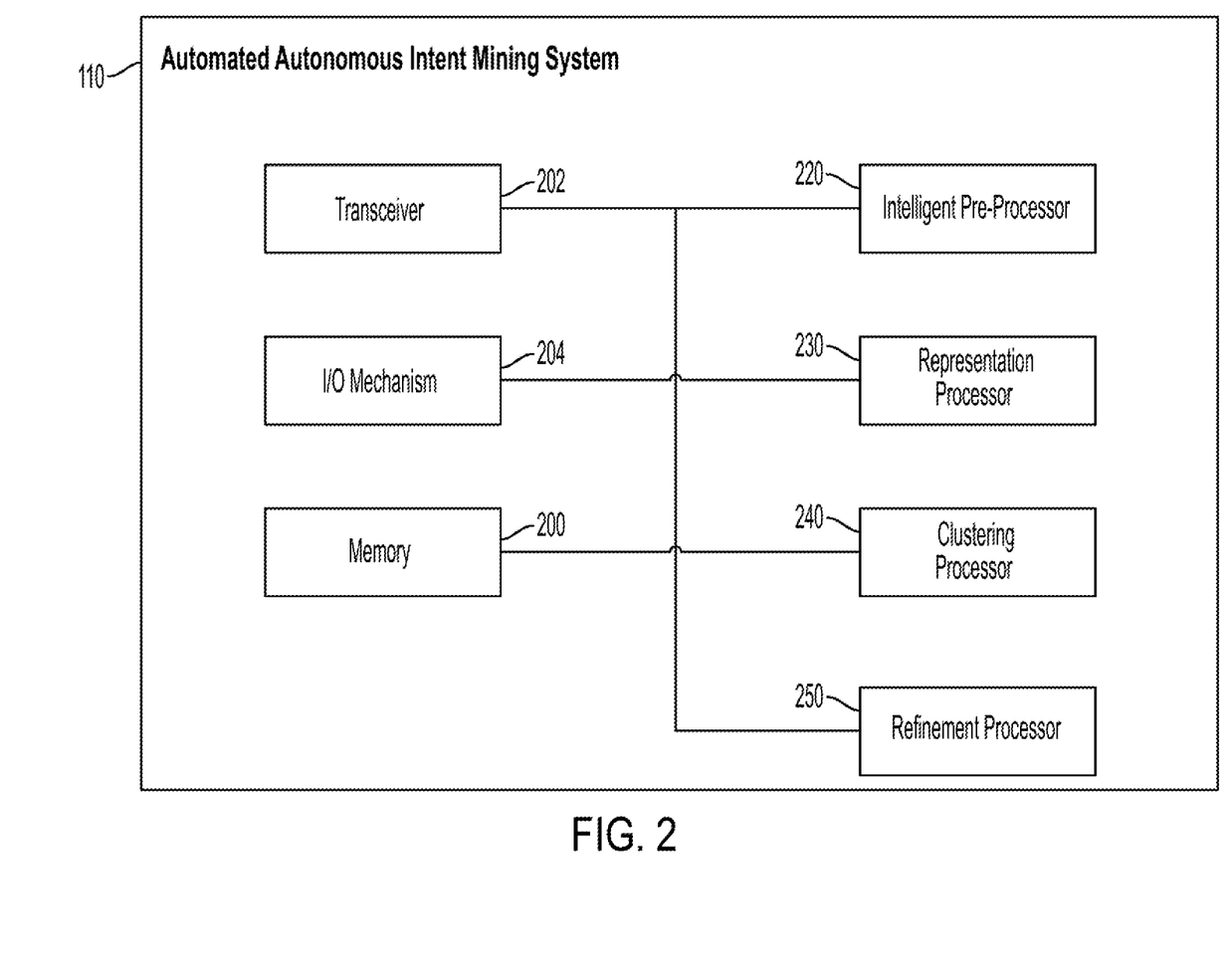
FIG. 2 is a block diagram illustrating a system for mining intent from a conversational corpus in accordance with at least one embodiment.

FIG. 2 is a block diagram illustrating a system 110 for mining intent from a conversational corpus in accordance with at least one embodiment. The embodiment of the system 110 as shown includes a memory 200, a transceiver 202, input/output (I/O) mechanisms 204, an intelligent pre-processor 220, a representation processor 230, a clustering processor 240, and a refinement processor 250.

The memory 200 is configured to store the sets of instructions or modules. Some of the commonly known memory implementations can be, but are not limited to, a Random-Access Memory (RAM), a Read-Only Memory (ROM), a Hard Disk Drive (HDD), and a secure digital (SD) card. The memory 200 may include a program module and program data. The program module includes a set of instructions that can be executed by the processors to perform specific actions. The data may be stored in various databases present in the memory 200 that are accessible to the processors executing the stored programs. Databases stored in the memory 200 can be implemented by using several technologies that are well known to those skilled in the art. Some examples of technologies may include, but are not limited to, MySQL® and Microsoft SQL®. In an embodiment, the databases may be implemented as cloud storage. Examples of cloud storage may include, but are not limited to, Amazon E3® and Hadoop® distributed file system. The memory 200 may also store databases including an utterance log and intent clusters that will be further described below with reference to FIG. 3.

The transceiver 202 may include logic, circuitry, interface, and/or code operable to communicate with one or more devices, such as the conversational database 120, the automated dialog system 130 and the participant systems 102 or any other devices that may be included in the environment 100. The transceiver 202 may implement one or more known technologies to support wired or wireless communication with the communication network 106. In embodiments of the invention, the transceiver 202 may be coupled to the I/O mechanism 204 through which the transceiver may receive or transmit instructions, queries, speech signals or other information. The transceiver 202 may include, but is not limited to, an antenna, a radio frequency (RF) transceiver, one or more amplifiers, a tuner, one or more oscillators, a digital signal processor, a universal serial bus (USB) device, a coder-decoder (CODEC) chipset, a subscriber identity module (SIM) card, and/or a local buffer. The transceiver 202 may communicate via wireless communication with networks such as the Internet, an Intranet and/or wireless network, such as a cellular telephone network, a wireless local area network (LAN) and/or a metropolitan network (MAN).

The I/O mechanism 204 may include multiple mechanisms for receiving speech input and generating output. As will be further described herein, the output may be usable as an intent classifier in the automated dialog system 130. The I/O mechanism 204 may comprise suitable logic, circuitry, interfaces, and/or code that may be configured to transmit or receive a speech signal or other information to and from devices such as the participant system 102 over the network 106. The I/O mechanism 204 may be configured to communicate with the transceiver 202 and may be connected to the communication network 106 through the transceiver 202. The I/O unit 204 may further include an input terminal and an output terminal that may be realized through an antenna, and Ethernet port, a USB port, or any other type of port that may be configured to receive and transmit data. The I/O unit 204 may include, but is not limited to, a keyboard, a mouse, a joystick, a touch screen, a touch pad, a microphone, a camera, a motion sensor, and/or a light sensor. Further, the I/O mechanism 204 may include a display screen realized using suitable logic, circuitry, code, and/or interfaces that may be operable to display output. The display screen may be or include but is not limited to a liquid crystal display (LCD) display, light emitting diode (LED) display, or an organic LED (OLED) display.

The intelligent pre-processor 220 operates on an input text-based conversation corpus to extract relevant utterances. In embodiments of the invention, the intelligent pre-processor 220 receives the text-based conversation corpus from a dialog system that includes natural language processing components enabling it to operate on audio input and convert the syntax to text capable of analysis. The text-based chat corpus may be pre-processed, and customer utterances and agent utterances are preferably separated and accompanied by time stamps. The intelligent pre-processor 220 is connected with the I/O mechanism 204 to operate on the text-based input to identify relevant utterances.

In order to accomplish the processing, the intelligent pre-processor 220 operates on customer utterances as only the customer utterances are relevant for the purpose of discerning intent. The intelligent pre-processor 220 extracts 'k' lines of customer utterances per conversation that are likely to represent a top-level intent of the conversation. The intelligent pre-processor 220 utilizes algorithms to identify the relevant utterances from all of the customer utterances. The intelligent pre-processor 220 may utilize a heuristic approach and extract the first customer utterance following the agent signature utterance, which may, for example, be "How can I help you today?". Thus, the extracted customer utterance could be a set of multiple sentences representing either the context of the conversation or an actual intent. In order to extract the sentences that capture the intent, the intelligent pre-processor 220 searches for intent indicator phrases within the extracted utterances. For example, the intelligent pre-processor 220 searches for sentences starting with "I want to", "I need to", or "I would like to". Other indicator phrases may be used depending on the domain or application. However, the intelligent pre-processor 220 starts with the above-identified seed set and appends this set by finding neighboring phrases via training a corpus-specific word-embedding.

The intelligent pre-processor 220 may also perform speech recognition, speech segmentation, sentiment analysis, topic segmentation and recognition, word sense disambiguation, and any other operations necessary to facilitate the analysis necessary for utilizing the framework described herein. The intelligent pre-processor 220 may include suitable logic, circuitry, and/or code that may be configured to execute instructions stored in the memory 200. The intelligent pre-processor 220 may be implemented based on a number of processor technologies that include, but are not limited to an X-86 based processor, a reduced instruction set computing (RISC) processor, an application-specific integrated circuit (ASIC) processor, a couples set computing (CISC) processor, a microprocessor, a microcontroller, or other suitable structures. Code integrated with the intelligent pre-processor 220 may include python source code or another suitable type of code.

The representation processor 230 utilizes stored instructions to create a numeric representation of the utterances that are extracted by the intelligent pre-processor 220. Several different input representations can be utilized and combined. For example, the representation processor 230 may utilize a semantic representation such as universal sentence encoding (USE), a surface level representation such as TF-IDF scores, and a corpus specific representation derived using Word2vec. USE encoder is trained using multi-task learning by feeding the representations of sentences to multiple unsupervised and supervised down-stream tasks. USE models have been trained with a focus towards transfer learning to support multiple natural language processing classification and semantic clustering tasks.

In embodiments of the invention, the representation processor 230 applies a transformer-based variant of USE, known as USE-T. USE-T is trained using the encoder subgraph of transformer architecture. USE-T encoder includes a multi-head attention module follow by a feed forward neural network. Thus, embodiments of the invention utilize a pre-trained USE-T to extract rich semantic representations for customer utterances to be fed to a clustering algorithm for intent mining. An attention mechanism can be used to learn context-aware word representations for each word in an input sentence. The context-aware word representations can be averaged using an element-wise sum divided by a sentence length to achieve a sentence representation. Any combination of these representations can be utilized to create a single numerical vector representation for processing.

The representation processor 230 may implement known processing hardware as described above and utilize code that defines the framework as set forth below with respect to FIG. 6. The vector representation of the pre-processed speech serves as input to the clustering processor 240.

The clustering processor 240 operates on the output of the representation processor 230 to cluster the representations. In embodiments of the invention, the clustering processor 240 utilizes code stored in the memory 200 in order to group the input representations into separate clusters. The stored code may include clustering algorithms such as k-means, Louvain, deep embedded clustering (DEC), and improved deep embedded clustering (IDEC). The k-means and Louvain algorithms are two-phased approaches with a first phase of learning a good representation of the data and second phase for learning cluster assignments based on the input representation. On the other hand, DEC and DEC are "end-to-end" clustering techniques that learn the input representations and cluster assignments simultaneously. One or more of these clustering algorithms may be utilized to cluster the representations. An optimal clustering technique will derive clusters that represent topics or intents such that utterances expressing the similar or same intent are grouped together.

The refinement processor 250 is operable to refine the clusters to achieve improved results. In an embodiment of the invention, the refinement processor 250 utilizes stored code for duplicate question detection (DQD). The identification of duplicate questions is closely related to the task of identifying whether two or more utterances belong to the same intent. Given a cluster of "n" utterances, the refinement processor 250 creates all pair combinations of the utterances in the clusters that were classified as duplicates or non-duplicates with the DQD model. The refinement processor 250 then applies transitive closure on the classified pairs to prune the original cluster. The refinement processor 250 classifies duplicate utterances in the same cluster and classifies non-duplicates in different clusters. The refinement processor 250 may additionally or alternatively perform predicate-object extraction at an utterance level in order to append extracted predicates and objects to the feature representation of each utterance to enable refinement of clusters. The predicate and object features may be used before the clustering procedure or during cluster refinement to separate intents that are otherwise closely related but differ in terms of the predicate or object. The cluster refinement process yields well-separated clusters that represent fine-grained intents.

Each of the processors described above can be utilized to implement multiple discrete software modules performing each of the functions described herein. Processors can be realized through a number of processor technologies known in the art. Examples of the processor can be an X86 processor, a RISC processor, an ASIC processor, a CISC processor, or any other processor. Furthermore, although a single memory structure is shown, multiple memory structures may be included. Multiple processors are shown but can be combined into fewer processors if desired. The processors are configured to execute sets of instructions stored in the memory 200. The processors gather the sets of instructions from the memory and execute the sets of instructions.

Figure 3:
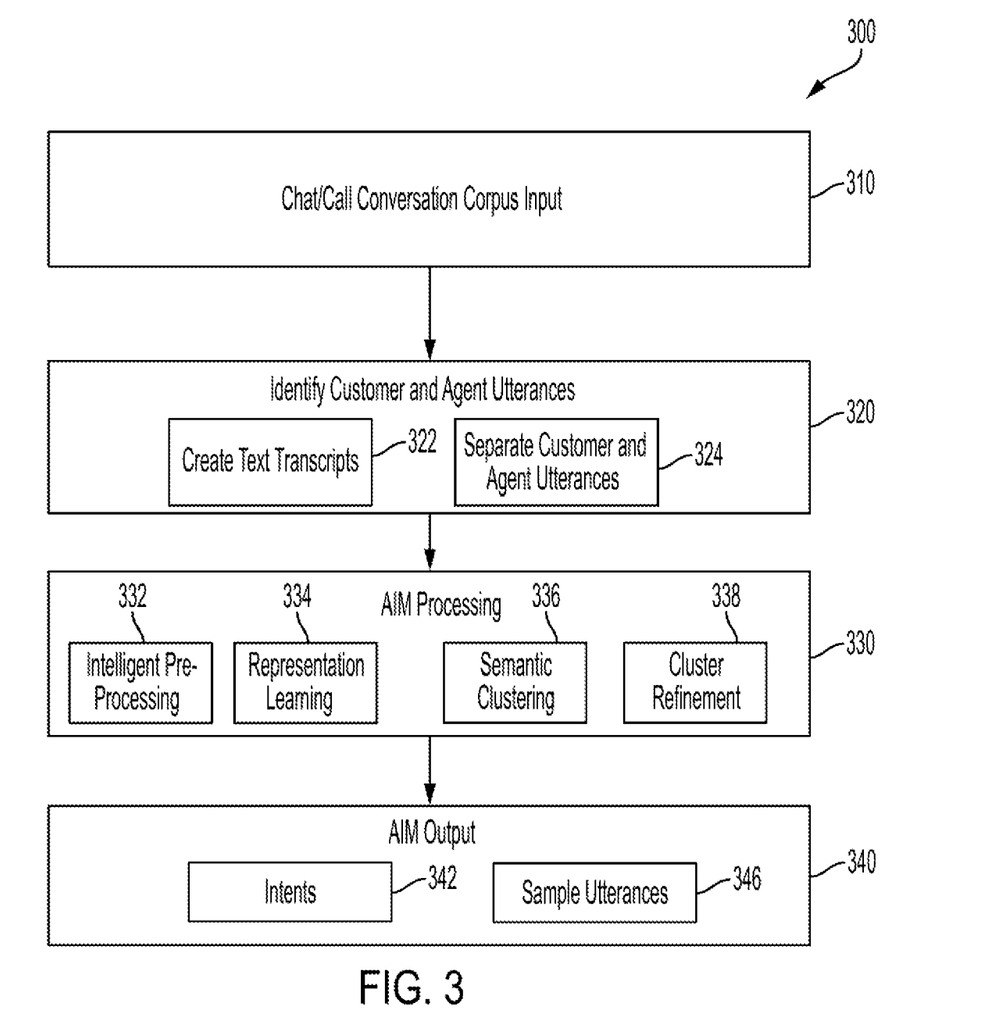
FIG. 3 is a workflow diagram illustrating an intent mining process in accordance with at least one embodiment.

FIG. 3 is a workflow diagram illustrating an intent mining process in accordance with at least one embodiment. At step 310, chat/call conversation data is collected from an unlabeled historical chat corpus. The chat corpus may be stored in a database and may have been collected over time based on human agent and customer interaction. From the input, a system such as a natural language processing system processes the data in step 320. Processing of the data in step 320 may include creating text transcripts from speech data at 322 and separating customer and agent utterances at 324.

Automated intent mining processing occurs in step 330. The autonomous intent mining system utilizes the intelligent pre-processor to identify customer utterances that are likely to carry the top-level intent for each conversation at 332. The representation processor operates to create representations of the extracted utterances at 334 and the clustering processor performs semantic clustering at 336 to cluster the created representations. Additionally, the automated intent mining processing includes cluster refinement at 338. The system generates output at 340. The output includes intents 342 and sample utterances 346. The clustering is performed such that utterances expressing the same or similar intents are grouped together.

Figure 4:
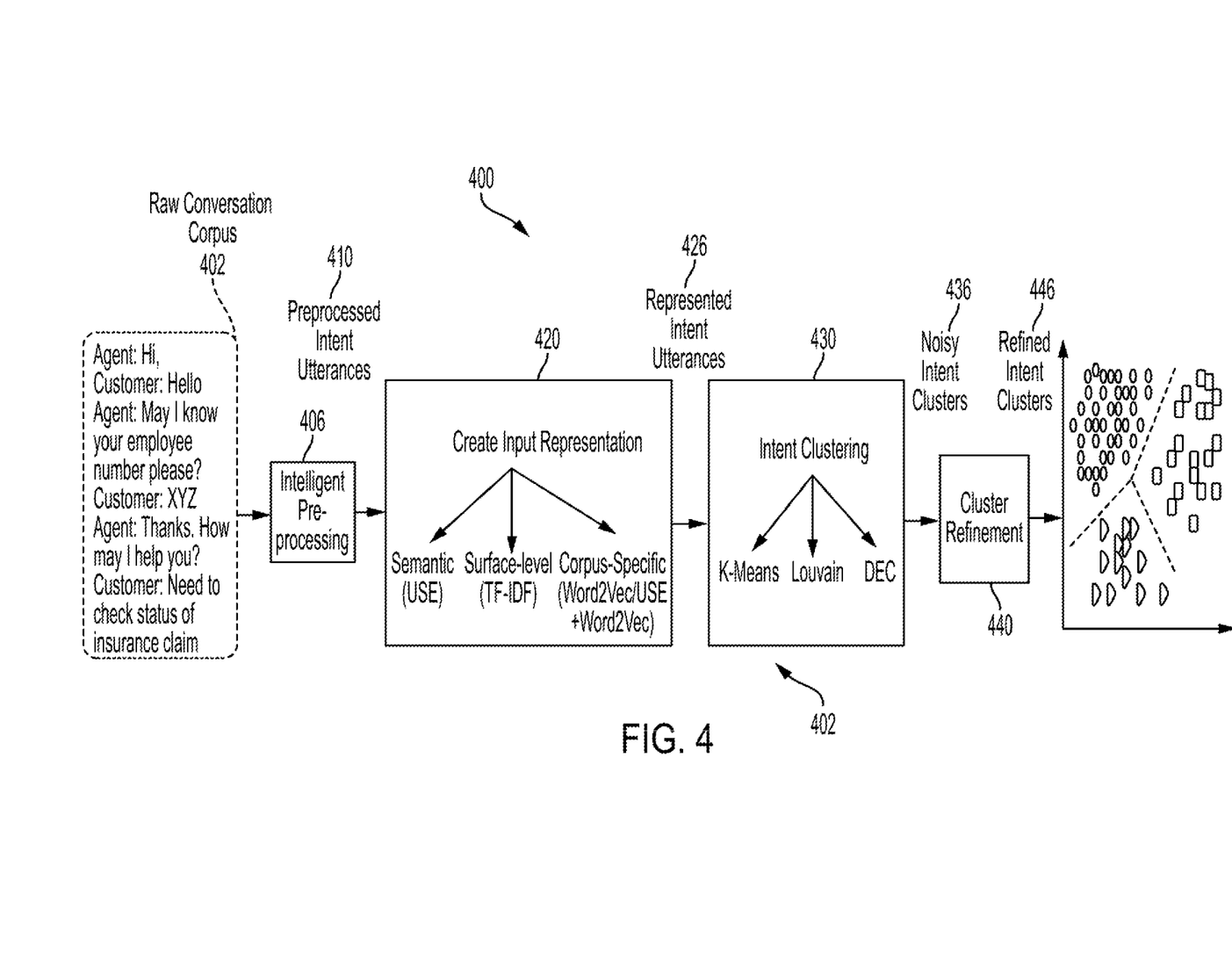
FIG. 4 is a workflow diagram illustrating operation of the autonomous intent mining system in accordance with at least one embodiment.

FIG. 4 is a workflow diagram illustrating detailed operation of the autonomous intent mining system in accordance with at least one embodiment. A raw conversation corpus 402 includes customer and agent utterances. At step 406, the autonomous intent mining system performs intelligent pre-processing. The output of the intelligent pre-processing of step 406 includes preprocessed intent utterances 410. The preprocessed intent utterances 410 are fed to the representation processor to create an input representation at step 420.

As illustrated, multiple algorithms including USE, TF-IDF, and corpus-specific may be utilized and combined to create numerically represented intent utterances 426. The represented intent utterances 426 are fed to the clustering processor to perform intent clustering at step 430. The clustering processor may utilize K-means, Louvain, and/or DEC algorithms to perform the clustering. The output of the clustering process 430 is a group of noisy intent clusters 436. The noisy intent clusters 436 may be fed to the refinement processor for cluster refinement at step 440. As explained above, the refinement processor may refine clusters using one of a variety of techniques, such as duplicate detection or predicate-object extraction. The output of the refinement process 440 is a group of refined intent clusters 446 that can be used for intent classification.

Figure 5:
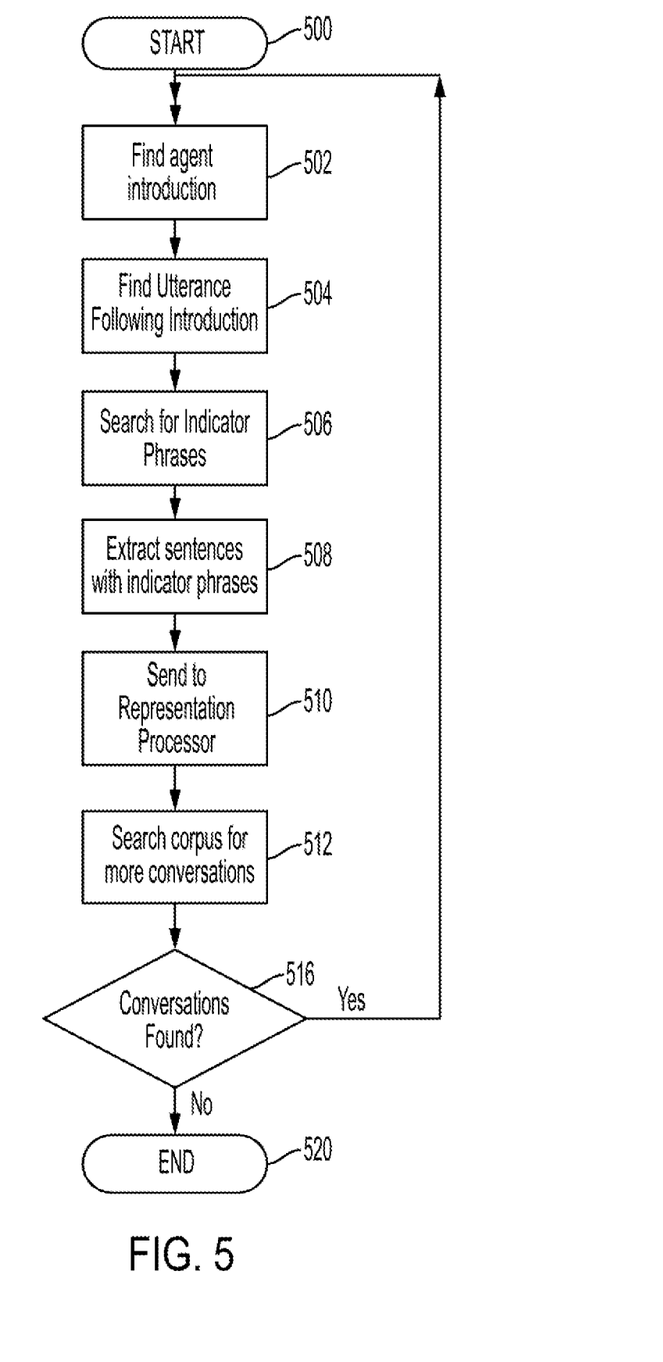
FIG. 5 is a flowchart illustrating a method for intelligent pre-processing in accordance with at least one embodiment.

FIG. 5 is a flowchart illustrating a method for intelligent pre-processing in accordance with at least one embodiment. The method begins in step 500 and the intelligent pre-processor finds the agent signature utterance for a selected conversation in step 502. For each agent-customer conversation, the system focuses only on mining the "top-level customer intent". To extract the sentences that express the top-level intent, the intelligent pre-processor first uses a heuristic based approach whereby it extracts the first customer utterance that follows the agent signature utterance, e.g., "How can I help you today".

In step 504, the intelligent pre-processor identifies the customer utterance following the introduction. The extracted customer utterance could be a set of multiple sentences representing either the context of the conversation or the actual intent. Within the identified customer utterance, the intelligent pre-processor searches for indicator phrases in step 506. Indicator phrases may begin with "I would like to . . . ", "I need to . . . ", :I want to . . . " The system starts with a seed set like {"I would like to", "I need to", "I want to"} and further appends this set by finding neighboring phrases via training a corpus-specific word-embedding. The intelligent pre-processor may extract only those sentences from an utterance that includes at least one such indicator phrase.

In step 508, the intelligent pre-processor extracts the sentences having indicator phrases. The intelligent pre-processor sends these sentences to the representation processor in step 510. The intelligent pre-processor may also send the extracted utterances to the clustering processor and the refinement processor. The intelligent pre-processor continues to search the corpus for more conversations in step 512. If more conversations are found in step 516, the intelligent pre-processor returns to step 502 to analyze the next conversation. However, if no more conversations are found, the process ends in step 520.

Figure 6:
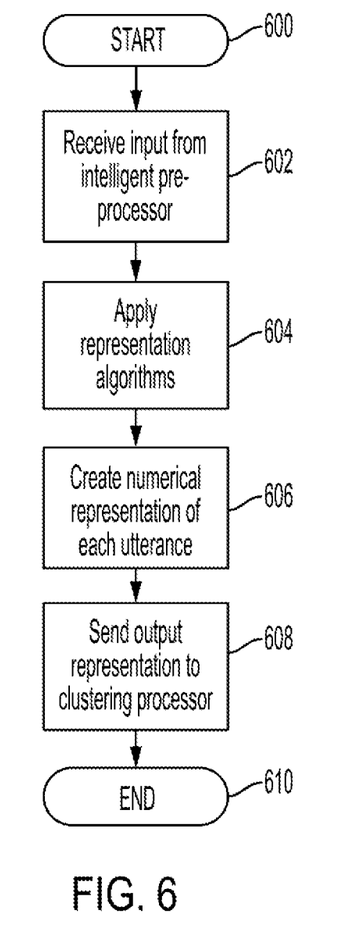
FIG. 6 is a flowchart illustrating a method for representation processing in accordance with an embodiment of the invention.

FIG. 6 is a flowchart illustrating a method for representation processing in accordance with an embodiment of the invention. The method begins in step 600 and the representation processor receives utterances from the intelligent pre-processor in step 602. In step 604, the representation processor applies one or more representation algorithms. The representation algorithms may include, for example surface level algorithms such as Tf-Idf, semantic algorithms, such as USE, corpus specific embedding using Word2Vec, or USE+Word2Vec. In step 606, the representation processor creates a combined numerical representation of each utterance, which may be a vector representation or a combination of vector representations from the different representation algorithms. In step 608, the representation processor sends the representation to the clustering processor and the process ends at step 610.

Figure 7:
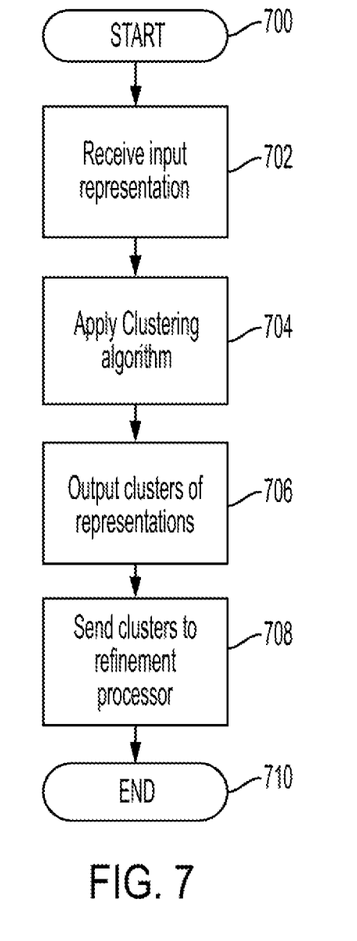
FIG. 7 is a flowchart illustrating a method for clustering in accordance with an embodiment of the invention.

FIG. 7 is a flowchart illustrating a method for clustering in accordance with an embodiment of the invention. The process begins in step 700 and the clustering processor receives the input representation in step 702. At step 704, the clustering processor applies a clustering algorithm. The clustering algorithm may, for example, be a two phased clustering algorithm such as K-means, Louvain, or Autoencoder+K-means. The clustering algorithm may alternatively be an end-to end clustering algorithm such deep embedded clustering (DEC) or improved deep embedded clustering (IDEC). DEC is an end-to-end unsupervised neural clustering technique that aims to learn feature representations and cluster assignments simultaneously. Application of the clustering algorithm creates an output of noisy clusters of representations in step 706. In step 708, the clustering processor sends the output to the refinement processor and the clustering process ends in step 710.

Figure 8:
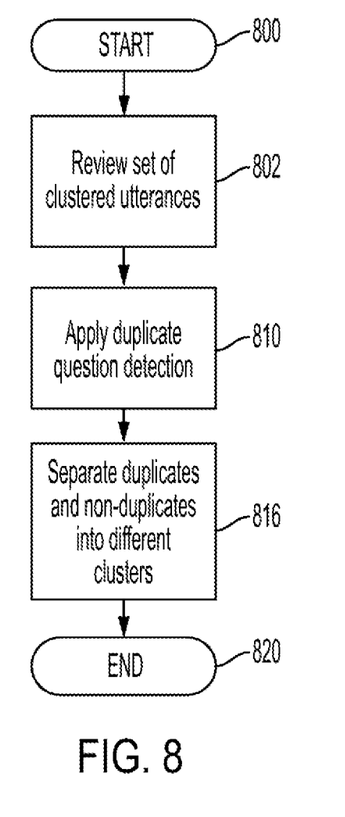
FIG. 8 is a flowchart illustrating a method for cluster refinement in accordance with an embodiment of the invention.

FIG. 8 is a flowchart illustrating a method for cluster refinement in accordance with an embodiment of the invention. The process begins in step 800 and the refinement processor reviews the clustered utterances in step 802. In step 810, the refinement processor performs duplicate question detection on the noisy clusters. In step 816, the refinement processor separates duplicates and non-duplicates into different clusters, and the process ends in step 820.

These steps illustrate one embodiment of cluster refinement. However, additional or alternative measures can be taken to refine noisy clusters. For example, the system can utilize predicate-object extraction and append the extracted predicates as features to the existing representation before clustering or use this for cluster refinement.

Thus, the process provides as an output 'intent clusters' with corresponding 'sample utterances' which can be incorporated into an intent classifier for an AI dialog system. The clusters can be directly used by a dialog designer to create such a training dataset in lesser time, with lesser effort and while ensuring maximum coverage of intents expressed in multiple ways.

As an example of the above-described process, the following utterances may be extracted from a raw chat corpus by the intelligent pre-processor described above:

1. ! I have a tobacco surcharge for my spouse that I am paying $62.50 for. Can you tell me if I can still Contact HealthResource to either participate in the tobacco cessation program or is it too late?
2. , I was actually chatting with another rep & I closed out of the session. I have a tobacco surcharge for my spouse that I am paying $62.50 for. Can I still contact HealthResource to have him participate in the tobacco cessation or is it too late
3. While selecting annual plan for 2018, i might have accidently selected my wife as a smoker and hence getting a $62 tobacco surcharge on her name
4. I was checking on my benefits, can you confirm that I am not being charged the tobacco surcharge for me or my wife?
5. —You helped me yesterday with adding my new spouse who is retired. And afterwards, Jeff and I went in and made the benefit selections. I need help with the Tobacco surcharge.
6. I am paying the Spouse Tobacco Surcharge and I need to know if my husband is eligible to do the cessation sessions and get the charge removed.
7. I have 2 questions. 1) tobacco spouse surcharge 2) dental Each of these utterances was stored in the chat corpus in the context of a larger conversation. The intelligent pre-processor 220 removed noise in the conversations and extracted only the statements shown above. The representation processor 230 operates on the extracted utterances and similarly represents all of the utterances related to a tobacco charge shown above. As illustrated, two types of common inquiries occur. Q1 (in italics) asks why the tobacco surcharge is being applied and Q2 (in bold) asks about enrollment in a smoking cessation program. The representation processor 230 represents these queries similarly due to context and thus they are ultimately grouped in the same cluster by the clustering processor 240. To optimize the performance of an AI dialog system, these queries should ideally be placed in different clusters. The refinement processor 250 described above aims to separate those utterances falling within Q1 into different clusters than those falling within the scope of Q2. The separation may occur with a refinement processor using duplicate questions detection or predicate-object extraction. If using predicate-object extraction, the refinement processor 250 appends extracted predicates as features to the existing representation. While predicate-object extraction is described herein as related to cluster refinement, it could also be applied prior to clustering to alter the created representation so that the clustering algorithm will more accurately cluster the extracted utterances.

Experimental results for various combinations of representation and clustering techniques identified above are illustrated in Table 1 below.

represents true cluster labels; and (3) Adjusted Rand Index (ARI), where ARI=(RI−Expected RI)/(Max_RI−Expected_RI).

As shown, during experimentation, USE paired with vanilla K-means outperformed all other illustrated techniques on NMI and ARI metrics and reported a cluster purity of approximately 80%. TF-IDF followed by autoencoder dimension reduction also reported a competitive performance using K-means, indicating that the dataset has a limited vocabulary. The extracted intent clusters as a whole had approximately 80% purity, which means an average cluster represents an intent category in the annotated data to an extent of 80% with 20% remaining as noise.

Accordingly, a system is provided that makes use of unlabeled conversations to extract user intents via intelligent pre-processing of conversations, appropriate semantic representations, clustering of representations, and post-clustering cluster refinement procedures.

The method, the system, and the computer program product, as described above, have numerous advantages. For example, embodiments of the invention are unsupervised and do not require a pre-labeled chat corpus. Furthermore, embodiments of the invention serve to improve the processing performance of AI dialog systems by providing a trained intent classifier. Thus, embodiments of the invention result both in improved processing performance and freeing up resources for other uses.

TABLE 1

A comparison of different AIM solutions comprising different choices of feature representations and clustering algorithms on the customer-agent chat corpus. For all evaluation metrics, higher scores indicate a better performance.

| | K-Means | | | Autoencoder + K-Means | | | Louvain | | | DEC | | |
|---|---|---|---|---|---|---|---|---|---|---|---|---|
| Representation | Purity | ARI | NMI | Purity | ARI | NMI | Purity | ARI | NMI | Purity | ARI | NMI |
| USE | 0.8046 | 0.7319 | 0.6394 | 0.7787 | 0.7074 | 0.5986 | 0.8205 | 0.4209 | 0.3836 | 0.7897 | 0.6869 | 0.588 |
| TF-IDF | 0.8430 | 0.5622 | 0.5178 | 0.8072 | 0.7025 | 0.6285 | 0.8755 | 0.5319 | 0.463 | 0.8037 | 0.6783 | 0.6362 |
| Word2vec | 0.6337 | 0.3171 | 0.282 | 0.7571 | 0.6374 | 0.5479 | 0.2908 | 0.2908 | 0.0652 | 0.7647 | 0.6340 | 0.5471 |
| USE + Word2vec | 0.7105 | 0.6183 | 0.5091 | 0.6208 | 0.2706 | 0.289 | 0.7575 | 0.7575 | 0.2961 | 0.3020 | 0.0494 | 0.0476 |

While Table 1 illustrates results for specific combinations of techniques, other combinations are within scope of the disclosure. For example, while Table 1 illustrates representations created by USE combined with Word2Vec, USE may also be combined with TF-IDF to produce positive results. Results may vary depending upon the particular dataset employed. Using a combination of representations such as pre-trained sentence embeddings from general domains (such as USE) with corpus-specific word/sentence embeddings (such as Word2Vec) or employing USE with surface level representations (such as TF-IDF) or a combination of the three representations is believed to be a novel approach not previously implemented, especially in the context of intent mining in dialog system applications.

To produce the results illustrated in Table 1, 588 customer utterances from the customer-agent chat corpus were manually labeled with 76 unique intent categories for validation purposes and the performance of AIM was evaluated by comparing the AIM intent clusters against this hand annotated validation dataset. Standard clustering metrics were utilized to evaluate the quality of the derived clusters. The metrics measured include (1) Purity, which represents the extent to which data points in the same predicted cluster actually belong to the same class; (2) Normalized mutual information (NMI), where NMI(C, T)=MI(C,T) $\sqrt{H(C)*H(T)}$ where C represents the predicted cluster labels and T The system as illustrated in the block diagrams and flowcharts of the above-described Figures includes one or more computer processors capable of accessing stored data and instructions to perform various steps and may operate in conjunction with software modules described herein in order to perform various functions. Many processors may be suitable and will be further described below. All of the described engines, generators, and other components may be or include software modules that are executed by the processor to perform their stated functions. Although the software modules are shown as discrete components, they may be integrated in various ways in accordance with embodiments of the invention. The programmable instructions can be stored and transmitted on a computer-readable medium. The disclosure can also be embodied in a computer program product comprising a computer-readable medium, or with any product capable of implementing the above methods and systems, or the numerous possible variations thereof.

All of the components shown in the FIGs. above may be, include, or be implemented by a computer or multiple computers. The system of the invention or portions of the system of the invention may be in the form of a "processing machine," i.e. a tangibly embodied machine, such as a general-purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general-purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

A person with ordinary skill in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc. The claims can encompass embodiments for hardware, software, or a combination thereof.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements. While particular embodiments of the invention have been illustrated and described in detail herein, it should be understood that various changes and modifications might be made to the invention without departing from the scope and intent of the invention.

What is claimed is:

1. An autonomous automated intent mining system for automated extraction of intents from conversation data in a text-based conversation corpus for use in an artificial intelligence (AI)-driven dialog system, the intent mining system comprising:

an intelligent pre-processor operating on the conversation data in the text-based conversation corpus stored in a computer memory to identify relevant utterances, the operating including separating customer utterances from agent utterances and operating only on the customer utterances by extracting customer utterances immediately following an agent signature utterance, searching for intent indicator phrases within the extracted customer utterances, preprocessing the customer utterances including the intent indicator phrases, and outputting the pre-processed customer utterances as the identified relevant utterances;

a representation processor for operating on the identified relevant utterances to create a numerical representation of each of the identified relevant utterances; and a clustering processor for generating clusters of utterances and classifying each of the identified relevant utterances into a cluster based on the numerical representation of each utterance, wherein each generated cluster represents a unique intent for use in the AI-driven dialog system.

2. The system of claim 1, wherein the numerical representation created by the representation processor is a combination of multiple input representations for each relevant utterance.

3. The system of claim 1, further comprising a refinement processor, wherein the refinement processor performs duplicate detection on all pair combinations in an original cluster, wherein duplicates remain in the original cluster and non-duplicates are placed in a different cluster.

4. The system of claim 1, wherein the conversation data is unlabelled and the intelligent pre-processor operates on the conversation data in an unsupervised manner.

5. The system of claim 1, wherein the representation processor utilizes at least one of a semantic, a surface level, and a corpus-specific algorithm to create the numerical representation.

6. The system of claim 1, wherein the clustering processor utilizes at least one of K-means, Louvain, and DEC algorithms to perform clustering.

7. The system of claim 6, wherein the clustering processor outputs noisy clusters and a refinement processor operates on the noisy clusters to create refined clusters.

8. The system of claim 7, wherein the refinement processor utilizes predicate-object extraction to create the refined clusters.

9. An autonomous automated computer-implemented intent mining method for automated extraction of intents from conversation data stored in a text-based chat corpus for use in an artificial intelligence (AI) driven dialog system, the intent mining method comprising:
   extracting the conversation data from a computer memory and operating on the conversation data with an intelligent pre-processor to identify relevant utterances from within the conversation data, the operating including separating customer utterances from agent utterances and operating only on the customer utterances by extracting customer utterances immediately following an agent signature utterance, searching for intent indicator phrases within the extracted customer utterances, preprocessing the customer utterances including the intent indicator phrases, and outputting the pre-processed customer utterances as the identified relevant utterances;
   operating on the identified relevant utterances using a representation processor to create a numerical representation of each of the identified relevant utterances; and
   generating, by a clustering processor, clusters of utterances and classifying each of the identified relevant utterances into a cluster based on the numerical representation of each utterance, wherein each generated cluster represents a unique intent and the clusters for use in the AI driven dialog system.

10. The method of claim 9, further comprising combining multiple input representations for each relevant utterance to create the numerical representation.

11. The method of claim 9, further comprising performing cluster refinement by applying duplicate detection to all pair combinations in an original cluster, wherein duplicates remain in the original cluster and non-duplicates are placed in a different cluster.

12. The method of claim 9, wherein the conversation data is unlabelled and the intelligent pre-processor operates on the conversation data in an unsupervised manner.

13. The method of claim 9, further comprising utilizing at least one of a semantic, a surface level, and a corpus-specific algorithm to create the numerical representation.

14. The method of claim 9, further comprising utilizing at least one of K-means, Louvain, and DEC algorithms to perform clustering.

15. The method of claim 14, wherein the clustering processor outputs noisy clusters and a refinement processor operates on the noisy clusters to create refined clusters.

16. A computer-readable medium storing computer code, wherein when executed by a processor, the computer code causes the computer to perform an autonomous automated intent mining method for extracting intents from conversation data stored in a text-based chat corpus for use in an artificial intelligence (AI) driven-dialog system, method comprising:
   extracting conversation data from a computer memory and operating on the conversation data to identify relevant utterances from within the conversation data, the operating including separating customer utterances from agent utterances and operating only on the customer utterances by extracting customer utterances immediately following an agent signature utterance, searching for intent indicator phrases within the extracted customer utterances, preprocessing customer utterances including intent indicator phrases, and outputting the pre-processed customer utterances as the identified relevant utterances;
   operating on the identified relevant utterances to create a numerical representation of each of the identified relevant utterances; and
   generating clusters of utterances and classifying each of the identified relevant utterances into a cluster based on the numerical representation of each utterance, wherein each generated cluster represents a unique intent for use in the AI-driven dialog system.

\* \* \* \* \*